March 6, 1928.
T. J. STROUSE
1,661,776
STORAGE BATTERY CHARGE INDICATOR
Filed Aug. 13, 1926
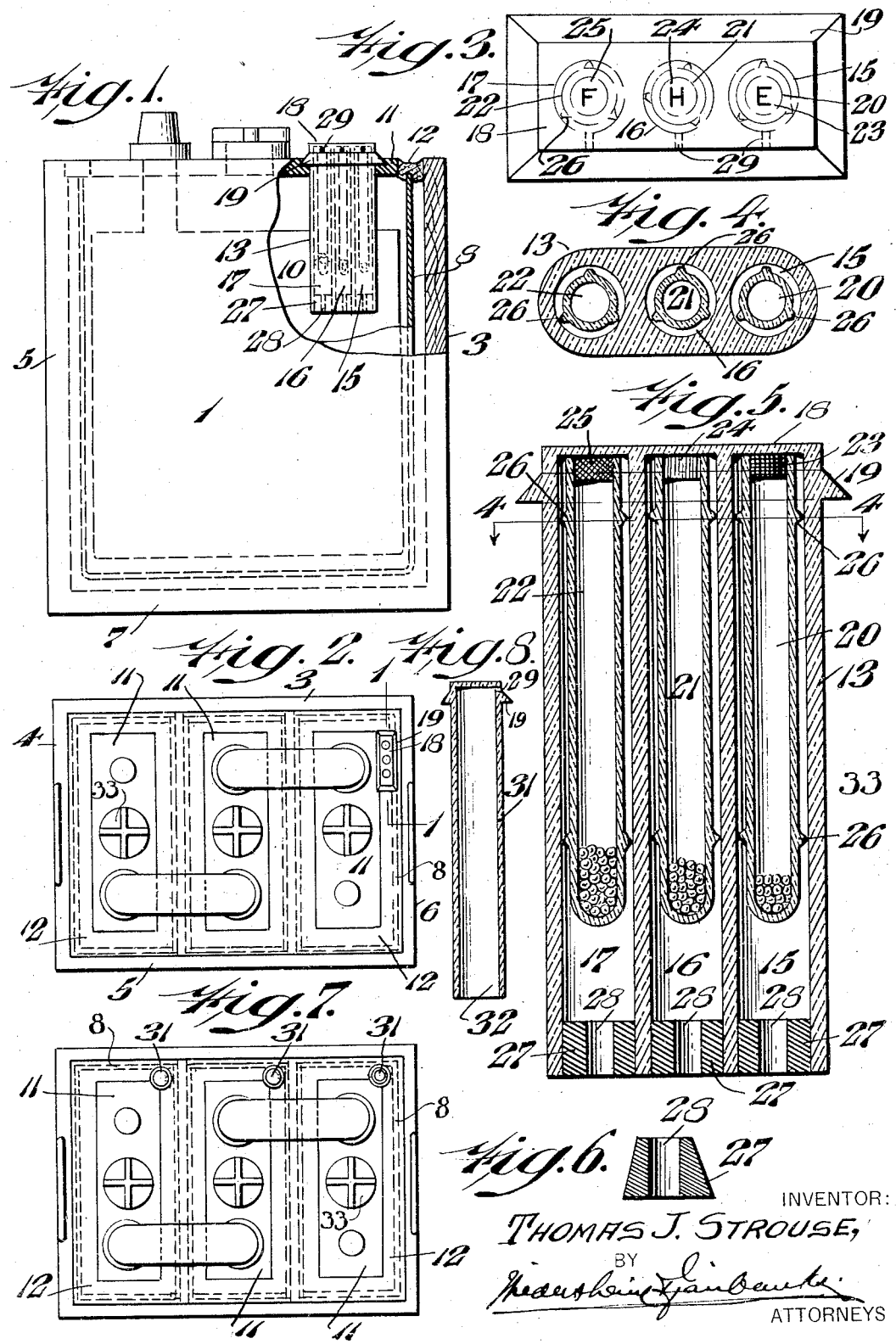
INVENTOR:
THOMAS J. STROUSE,
BY
ATTORNEYS Patented Mar. 6, 1928.

1,661,776

UNITED STATES PATENT OFFICE.

THOMAS J. STROUSE, OF POTTSTOWN, PENNSYLVANIA.

STORAGE-BATTERY CHARGE INDICATOR.

Application filed August 13, 1926. Serial No. 128,956.

My invention relates to a new and useful battery tester or charge indicator for electric storage batteries and the like, and it relates more particularly to a novel construction in an electric storage battery whereby the condition of the storage battery is visually indicated at all times, so that the reading of the battery by the usual syringe hydrometer, and in fact all manual testing of the battery is thereby eliminated, and thereby also enabling a constant observation of the condition of the battery without the removal of any of the battery fluid or acid for the purpose of making a gravity reading, as is now the common practice.

My invention consists more particularly in the provision of one or more float type of liquid gravity indicators suitably encased, and permanently mounted in the upper part of the electric storage battery and also permanently submerged in the battery fluid, said gravity indicator floats having their upper terminals visible from above when the specific gravity of the battery liquid is above a predetermined point, and adapted to submerge out of sight when the specific gravity of the battery liquid falls below said predetermined point, thereby visually to indicate the condition of the battery.
With the above ends in view, my invention consists of an upright elongated tubular housing having a transparent upper wall, closure, or terminal portion, said tubular housing being preferably made of an integral piece of transparent glass in its entirety, and having its lower end open and being provided with an upper exterior lateral supporting flange. My invention further consists of a gravity indicator float consisting of suitable elongated hollow tubular body closed at its lower end and open at its upper end, adapted to fit within the elongated tubular housing, and to move freely within the same.
My invention further consists in extending the elongated transparent glass tubular housing, through the upper cover of the storage battery, at a point between the insulating block which supports the battery plates and the wall of the cell or jar and into the battery solution, and embedding the upper lateral flange of the said elongated transparent glass tubular housing, in the bituminous filler or seal forming a part of the upper cover of the battery, thereby rigidly to support and position said tubular glass housing within the battery cell, with the upper transparent terminal wall of said elongated tubular transparent housing extending and projecting upwardly beyond the upper surface of the battery a slight extent.

My invention further consists in positioning within said elongated, hollow, tubular glass housing, thus rigidly supported within the battery between the walls of the battery jar or box and the lead plates of the battery, a suitable gravity indicator float, weighted or loaded to such an extent as to be raised or so as to float, in an upper position, at the desired specific gravity of the battery liquid, and to sink when the battery liquid falls to a lower specific gravity.

Thus according to my invention, the specific gravity of the battery liquid will be indicated visibly at all times by the position of the indicator float, since said float will be raised when the specific gravity of the battery liquid rises to, or above the predetermined point, with its upper terminal abutting against the underside of the transparent upper terminal wall of the tubular housing, within which it is contained, thereby making the upper portion of said indicator float visible through said transparent upper wall of said outer tubular glass housing. When the indicator float is thus visible through the transparent upper terminal wall of the glass housing, the battery liquid is known to be above the particular specific gravity, at which the float is loaded or weighted. When the specific gravity of the liquid falls below the particular point, the indicator float drops or sinks out of sight and is thus not visible through the transparent upper terminal wall of the outer glass housing, which projects above the upper surface of the battery, a slight amount as mentioned hereinbefore. By suitably coloring the upper terminal of the indicator float, the same may be made more conspicuous through the upper transparent terminal wall of the outer glass housing.

My invention further consists, moreover, in providing a series of successively graded or weighted indicator floats, preferably three in number, each loaded or weighted to a different specific gravity, so that by the visibility of any one or more of the series of indicator floats, the exact condition of the battery may be more accurately ascertained. The series of such indicator floats may be mounted in a corresponding series of individual tubular glass housing, or they may be mounted in a single integral multi-tubular glass housing, having a series of spaced and parallel elongated upright chambers, each adjusted to receive one of said series of floats.

For the purpose of illustrating my invention, I have shown in the accompanying drawings, forms thereof which are at present preferred by me, since they will give in practice, satisfactory and reliable results, although it is to be understood that the various instrumentalities of which my invention consists can be variously arranged and organized and that my invention is not limited to the precise arrangement and organization of these instrumentalities as herein shown and described.

Referring to the drawings,

Figure 1 represents a side elevation, partly in section, of an electric storage battery, having mounted therein a multi-tubular glass housing containing a series of successively graded indicator floats, embodying my invention.

Figure 2 represents a top plan view of the same, showing the arrangement of the multi-tubular glass housing.

Figure 3 represents a top plan view, on a greatly enlarged scale, of the multitubular transparent glass housing, embodying my invention.

Figure 4 represents a horizontal section on line 4—4 of Figure 5, showing the manner in which the indicator floats are positioned within the upright tubular chambers of the glass housing.

Figure 5 represents a vertical section on line 5—5 of Figure 3, illustrating a multi-tubular housing, having three parallel upright chambers therein for housing three successively loaded or graded indicator floats.

Figure 6 represents a vertical section of one of the perforated lower terminal plugs of resilient rubber, adapted to be forced into the lower open end of the tubular float compartments of the outer tubular glass housing.

Figure 7 represents a top plan view of an electric storage battery having mounted therein three single and individual tubular glass float housings, one in each of the three cells of the battery, containing the successively graded indicator floats, showing a modified embodiment of my invention.

Figure 8 represents a vertical section of a single tubular transparent glass housing adapted to receive a single indicator float, shown on a reduced scale.

Referring to the drawings, in which like reference characters indicate like parts, 1 designates the outer wooden or other box or casing of a storage battery, of any conventional construction, having the vertical sides 3, 4, 5 and 6, and the bottom 7. Within the box or casing 1, are positioned a plurality, usually three, battery jars or cells 8, of hard rubber or glass, embedded, supported or surrounded by a relatively hard bituminous composition, in the conventional manner. The lead battery plates 10 are also supported in the usual manner from an upper insulating or hard rubber plate or block 11, and are positioned within the hard rubber or glass battery jars 8. The upper edges of the battery jars 8, as well as the space between the walls of the battery jars and the insulating or hard rubber blocks 11, as well as the spaces between the successive hard rubber blocks 11 are filled in tightly, in the conventional manner, with a relatively hard bituminous material 12.

According to one embodiment of my invention, I provide a multitubular glass indicator float housing 13, having a plurality of upright parallel hollow float chambers 15, 16 and 17 therein, of circular cross-section, and having the upper ends thereof closed by an integral transparent glass wall 18. A suitable and downwardly beveled exterior flange 19, is formed integral with the housing 13, surrounding the same slightly below the upper terminal thereof, and is adapted to be embedded in the bituminous filler material 12 surrounding the hard rubber block 11, thereby rigidly to support the glass housing 13 with respect to the battery, as illustrated in Figure 1.

In the upright, tubular float chambers 15, 16 and 17, the indicator floats 20, 21 and 22 respectively are placed. The indicator floats 20, 21 and 22, are also of elongated tubular form, having their lower ends permanently closed, and are of a diameter less than the inner diameter of the chambers 15, 16 and 17. Each of the indicator floats is loaded successively with a greater amount of shot or other weighting material, so as to sink or submerge at successive and predetermined points of specific gravity of the battery liquid. The upper open ends of the indicator floats 20, 21, and 22 closed by suitable differently colored plugs 23, 24 and 25 respectively, of hard wax or the like.

In order to prevent the adhesion of the indicator float tubes to the inner walls of the float chambers 15, 16 and 17, and in order to insure the free movement of the said tubes 20, 21 and 22, within the respective upright chambers 15, 16 and 17, suitable slight lateral projections 26 are provided on the exterior of the tubes 20, 21 and 22, adapted to space said tubes from the walls of the chambers, thereby reducing the friction of the contact between said tubes and inner walls of said chambers.

Perforated resilient rubber plugs 27, having suitable apertures 28 extending therethrough, are forced into the lower ends of the float chambers 15, 16 and 17, so as to prevent the indicator tubes 20, 21 and 22 receding from and clear of the float chambers, when the specific gravity of the battery liquid falls and the indicator floats sink. In order to prevent the accumulation of gas in the upper closed end of the upright float chambers 15, 16 and 17, small horizontal vent openings 29 are provided in the upper ends of said chambers, extending laterally as shown in particularly in Figure 3, thereby avoiding any gas or air "cushion" in the upper ends of said chambers.

The multiple battery indicator unit 30, shown particularly in Figures 3, 4 and 5, having the plurality of sucessively graded gravity indicator floats 20, 21 and 22 therein, is positioned in one of the cells or jars 8 of the storage battery, as illustrated particularly in Figures 1 and 2.

The gravity indicator unit 30 is positioned vertically, between the last of the groups of lead plates, and one of the side walls of the battery jar 8. The dimensions of the glass housing 13, of the unit 30, are such as to allow the unit to be inserted into the free space usually present between the last lead battery plate and the side wall of the jar. The unit 30 is so positioned moreover, that the upper closed end of the housing 13 thereof projects upwardly beyond the top of the bituminous filler material 12 a slight distance, and so that the lateral flange 19 is imbedded in said bitumious material 12, thereby serving as an anchor, rigidly to support said indicator unit 30.

The successive indicator tubes or floats 20, 21 and 22, as illustrated in Figure 5, are loaded successively, to any desired specific gravity. For the standard lead storage battery most commonly in use, which is fully charged with the specific gravity of the liquid about 1300, and which is completely discharged with the specific gravity of the liquid at a point below 1125, the successive indicator float tubes 20, 21 and 22, are loaded to submerge at the specific gravities of 1125, 1175 and 1240 respectively. By this graduation of the successive indicator floats all three indicators will float in an upper or "visible position," when the battery is fully charged or substantially fully charged, that is, when the liquid is at a specific gravity of between 1250 and 1300; with the plugged upper ends of the float tubes abutting the underside of the transparent upper terminal walls of the chambers 15, 16 and 17. In this condition, each of the differently colored plugs 23, 24, and 25 will be clearly visible from above.

Between the specific gravity of about 1240 and about 1180, only the float 22 will submerge and drop out of sight, while as the battery is further discharged and the specific gravity of the battery liquid drops below the specific gravity of 1175, the float 21 also submerges, out of sight, and only the float 20 remains up and visible. This is an indication that the battery is more than half discharged and requires recharging. If the battery is fully discharged, or substantially so, and the specific gravity of the liquid drops below 1125, then the last indicator 20 submerges, out of sight, and the absence of any of the colored buttons or plugs 23, 24 and 25, from view, from above, indicates that the battery is completely discharged.

The plugs 25, 24, and 23, may be successively colored yellow, green and red, or any other suitable colors and suitable letters may also be used thereon, to indicate "fully charged," "half discharged" and "fully discharged" condition of the battery. The letters "F," "H" and "E" may be inscribed upon the colored plugs 25, 24 and 23 respectively, by a suitable contrasting color, to indicate "full," "half-full" and "empty" conditions of the storage battery.

While in Figures 1 and 2, merely one gravity indicator unit 30 is shown, positioned in only one of the several independent battery jars or cells, it is within the scope of my invention to mount a complete multi-indicator unit 30 in each one of the jars or cells of a storage battery, if so desired, thereby permitting an accurate observation not only of one of the cells of the battery but of each of the cells thereof. This may be desirable since very often the cells are not discharged and charged uniformly, but one of the cells may be charged or discharged more quickly than another.

For practical purposes however, one complete unit 30 in a storage battery of several cells, will be found sufficient as a guide in the proper care of the battery.

In Figures 7 and 8, I have illustrated a modified embodiment of my invention, wherein the successively graded gravity indicator floats are mounted in the successive cells of the battery. Here the glass housing 31 is provided with but a single float chamber 32, adapted to receive and house but one gravity indicator float. In this modification of my invention, a single tubular chamber housing 31 similar in detail to the multitubular housing 13, is positioned in each of the cells of the storage battery, and each of the glass housings 31 receives one of the successively graded or loaded indicator floats 20, 21 and 22. By this means, the average condition of the battery is ascertainable by the visual inspection of the three indicator floats.

It will thus be seen that by my invention, not only is the task of testing batteries totally eliminated, but the danger of removing acid from the batteries and the danger of spilling acid upon furniture or other articles, and the consequent damage is entirely eliminated. By my invention, an accurate check may be had of the condition of the battery without even opening the battery plugs 33, and without any additional instrument, and without removal of any acid. A further advantage of my novel "built-in" battery charge indicator of my invention, is that an inspection and "testing" of the battery is possible at all times and under all conditions, whether the battery is accessible or not, since the inspection or "testing" may be made without even reaching to the battery, but merely by observing the same, even at a substantial distance.

It is within the scope of my invention, moreover, to build the storage battery in a single integral multicellular jar or "box," comprising a relatively sturdy and thick hard rubber or other box, divided into suitable cells by integral partitions of hard rubber, and to mould or otherwise form suitable recesses in the side walls or partitions of the battery for receiving the glass housings 13 or 31, as the case may be. This construction may be preferable where the space between the last lead plate and the side wall of the battery cell is not sufficient properly to mount the indicator unit therebetween.

It will now be apparent that I have devised a new and useful storage battery charge indicator, which embodies the features of advantage enumeratetd as desirable in the statement of the invention and the above description, and while I have in the present instance shown and described preferred embodiments of my invention since they will give in practice satisfactory and reliable results, it is to be understood that such embodiments are susceptible of modification in various particulars, without departing from the spirit or scope of the invention or sacrificing any of its advantages.

Having thus described my invention, what I claim as new and desire to secure by Letters Patent is:

1. In combination with an electric storage battery comprising a container having opaque side and top walls, a liquid electrolyte therein and cathodes and anodes immersed in said electrolyte, of an indicator float adapted to submerge in the electrolyte when the specific gravity of the latter falls below a predetermined point, a generally upright, stationary tubular housing loosely surrounding said float, to guide the latter in a generally vertical direction between an upper and lower limit and to maintain the same constantly immersed in said electrolyte, said housing having an upper transparent terminal wall substantially flush with the upper opaque wall of said battery container and visible from without the same, against which transparent terminal wall, the float is adapted to abut from below in its upper limiting position, thereby to indicate visually from above, if the float is in the raised position.

2. In combination with an electric storage battery comprising a container having side and top walls, a liquid electrolyte therein and cathodes and anodes immersed in said electrolyte, of an upright stationary tubular housing rigidly carried by the battery container, a gravity indicator float loosely positioned within said housing adapted to submerge in the electrolyte when the specific gravity of the latter falls below a predetermined point, said housing having an upper transparent terminal wall, extending through the upper opaque wall of said container, against which the float is adapted to abut from below when in its upper limiting position, thereby visually to indicate the uppermost position of said float from above, a vent in the upper part of said housing, means to confine the float therein, and means to permit the ingress and egress of the electrolyte to the housing.

3. In a device of the character stated, a housing having a plurality of parallel elongated tubular chambers therein closed at the top with a transparent terminal wall, and a laterally projecting anchoring flange exterior of said housing near the upper end thereof, a plurality of successively graded gravity indicator floats loosely positioned within said elongated parallel chambers and free to move vertically therein, vents near the top of said chambers, and detachable means in the lower terminals of said chambers to enclose therein said indicator floats.

4. In a device of the character stated, a storage battery comprising a container having opaque side and top walls, having an electrolyte therein, a plurality of successively graded indicator floats positioned in said electrolyte and surrounded loosely by a stationary upright housing having a transparent upper terminal wall, said floats being adapted to recede from vision successively as the specific gravity of the electrolyte falls below successive predetermined points, and to be raised into upper limiting positions in inverse succession, with their terminals abutting the transparent upper wall of the housing, when the specific gravity of the electrolyte rises above said predetermined point thereby to give a visual indication from above, of the condition of said storage battery, and indicia on the upper terminals of said floats, indicative of the electrical charge in the battery.

5. In an electrical storage battery, a housing having a generally vertical elongated chamber therein, a transparent terminal wall closing the top of said chamber, a gravity indicator, a float loosely positioned within said elongated chamber and visible only through the upper transparent terminal wall thereof and means to permit the free ingress and egress of electrolyte into and from said chamber; said float being so graduated as to recede from vision through said upper transparent terminal wall when the specific gravity of the electrolyte falls below a predetermined point.

6. In an electrical storage battery, a housing, a plurality of generally vertical elongated indicator chambers, a transparent wall closing the upper terminals of each of said chambers, a plurality of successively graduated indicator floats loosely positioned in said chambers and visible only through the upper transparent terminal walls thereof, and means to permit the ingress and egress of electrolyte to and from said chambers; said floats being so graduated as to recede from vision through said upper transparent terminal wall, successively, as the specific gravity of the electrolyte falls below successive predetermined points.

THOMAS J. STROUSE.